Figure 1:
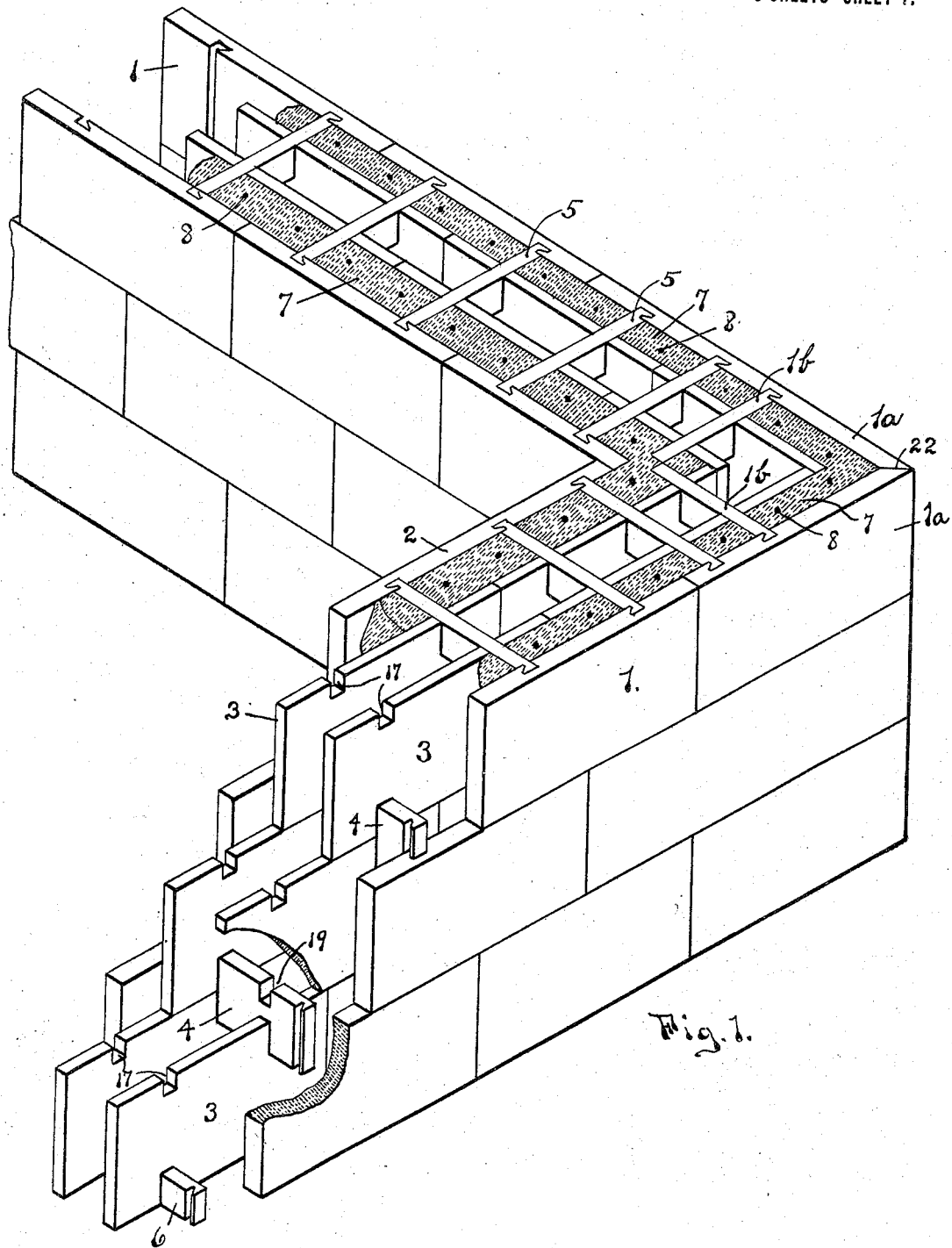

R. Z. HOPKINS.
BUILDING CONSTRUCTION.
APPLICATION FILED FEB. 26, 1914.

1,226,214.

Patented May 15, 1917.
6 SHEETS—SHEET 1.

WITNESSES:
L. M. Spencer
H. W. Kreinbring

INVENTOR.
Ralph Z. Hopkins
BY Edward N. Pagelsen,
ATTORNEY.

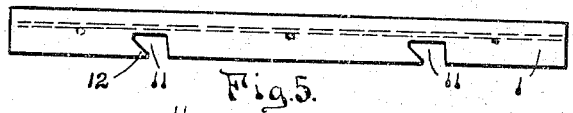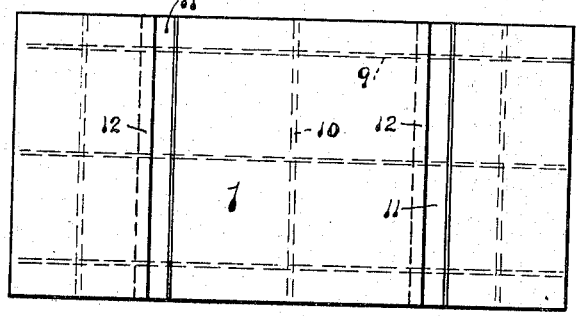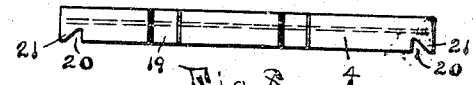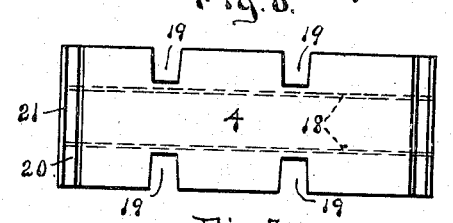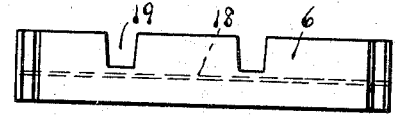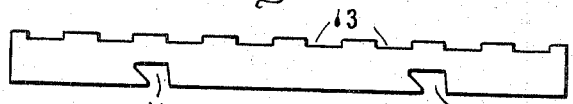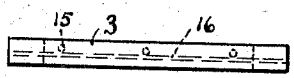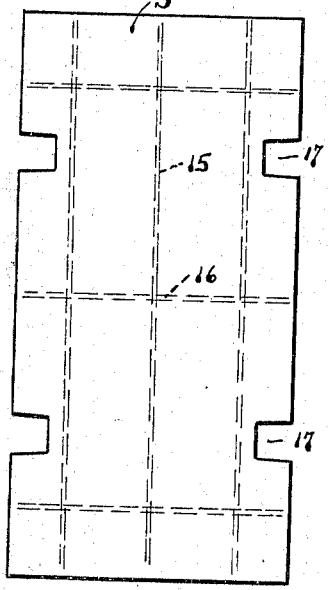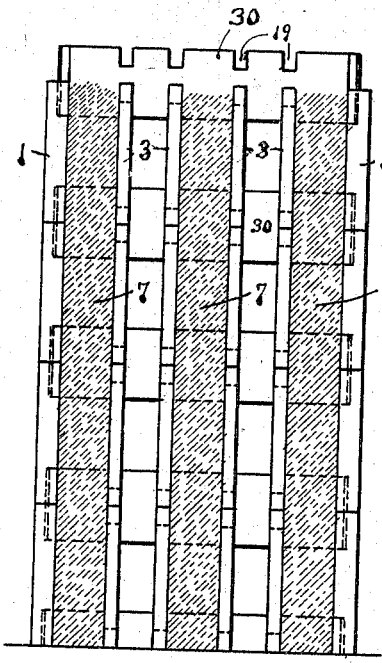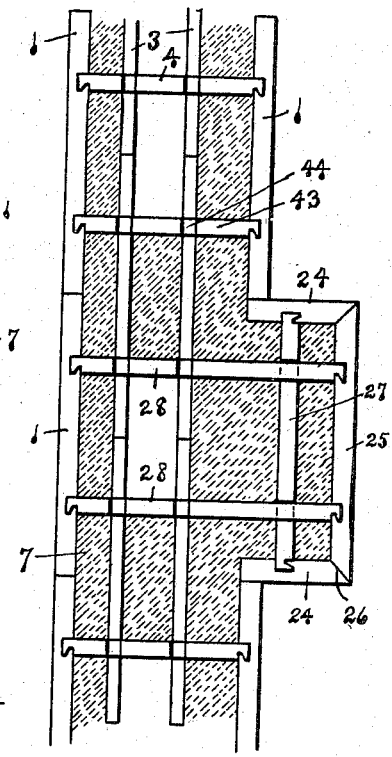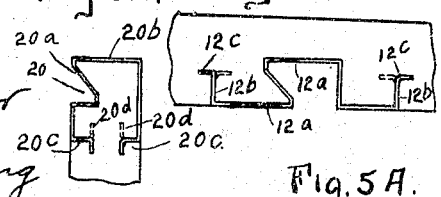

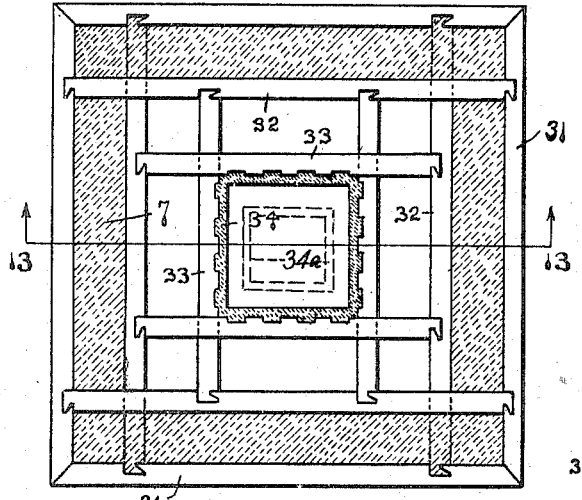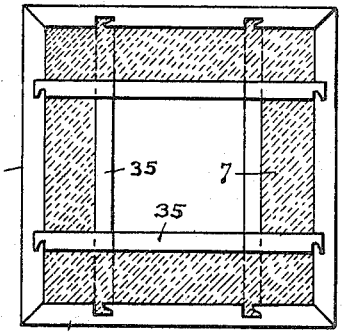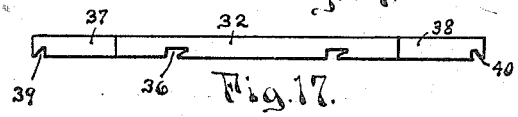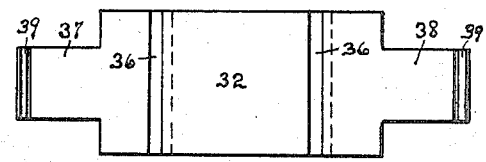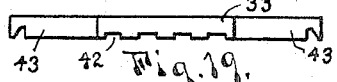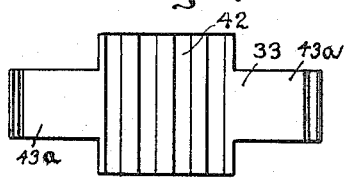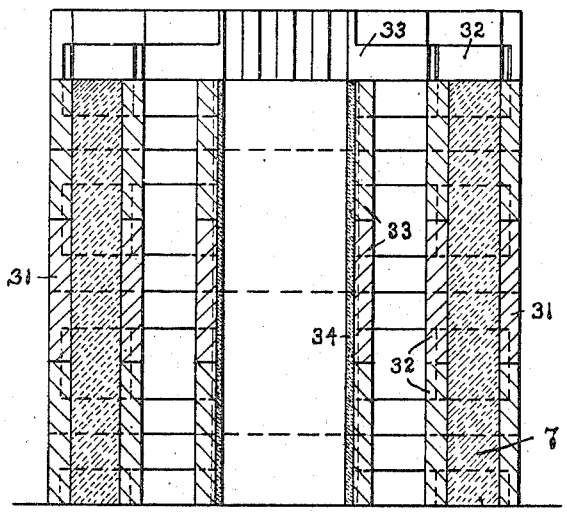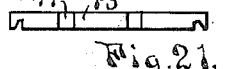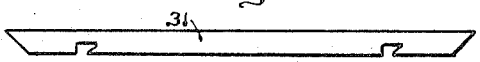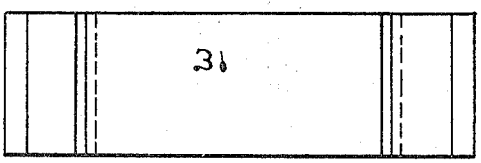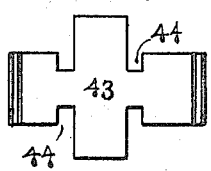

R. Z. HOPKINS.
BUILDING CONSTRUCTION.
APPLICATION FILED FEB. 26, 1914.
1,226,214.
Patented May 15, 1917.
6 SHEETS—SHEET 4.
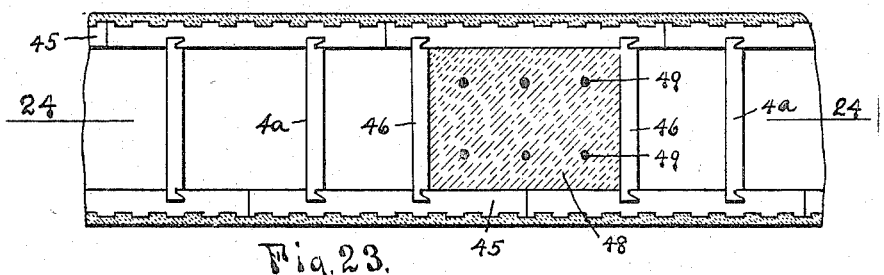
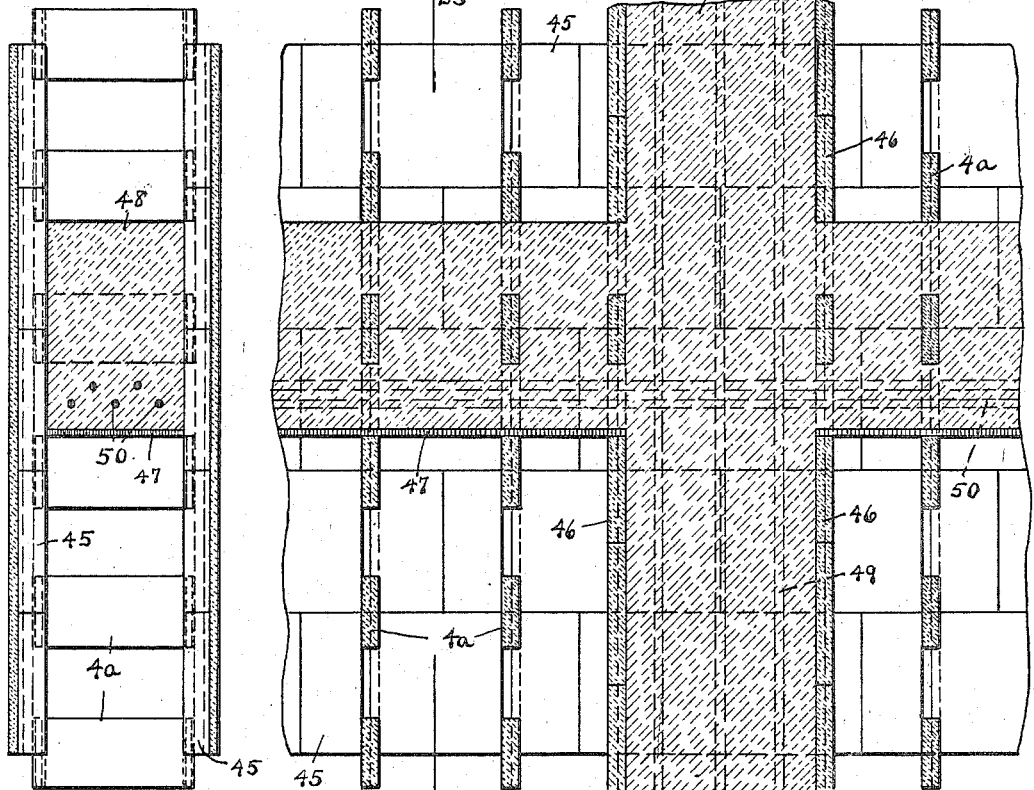
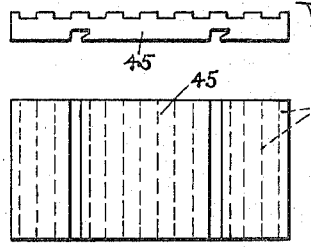
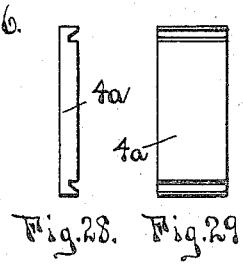
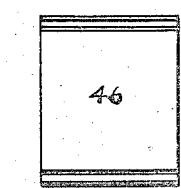
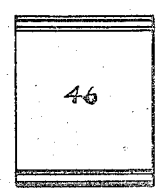
WITNESSES:
L. M. Spencer
H. W. Kreinbring
INVENTOR.
Ralph Z. Hopkins.
BY Edward N. Pagelsen,
ATTORNEY.

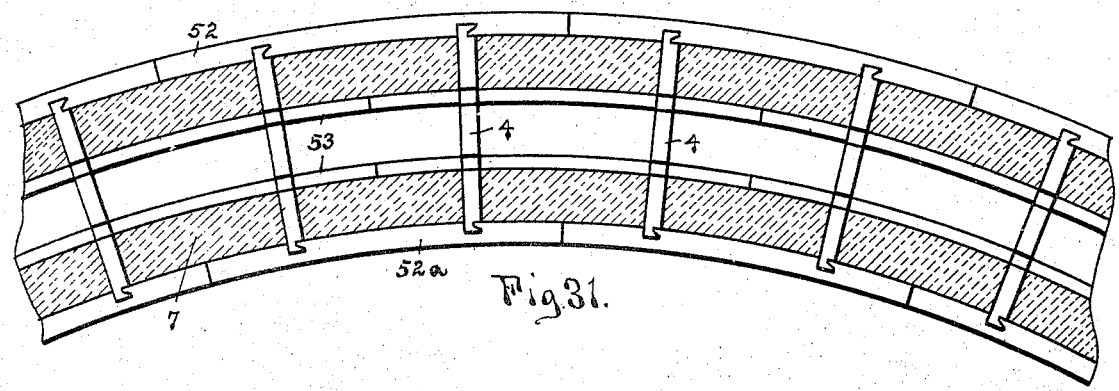
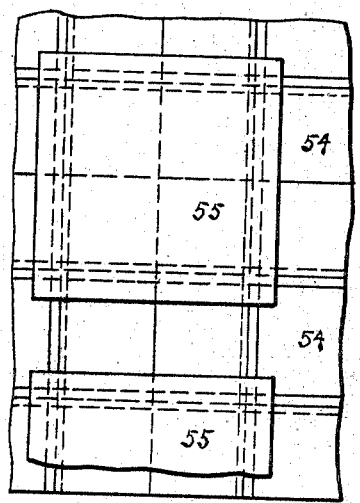
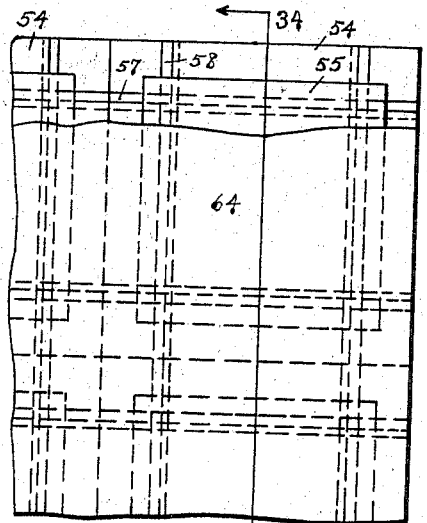
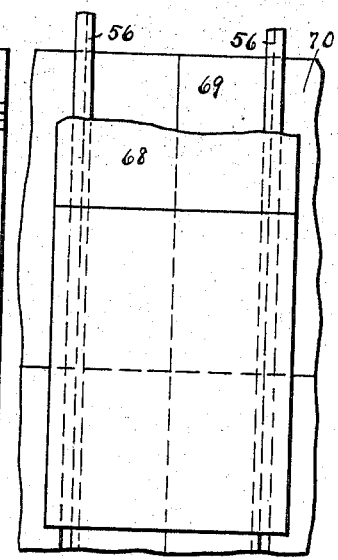
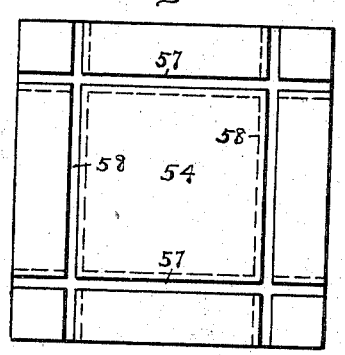
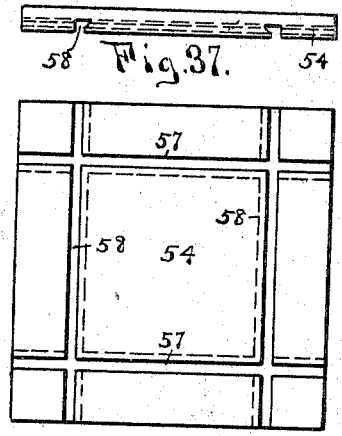
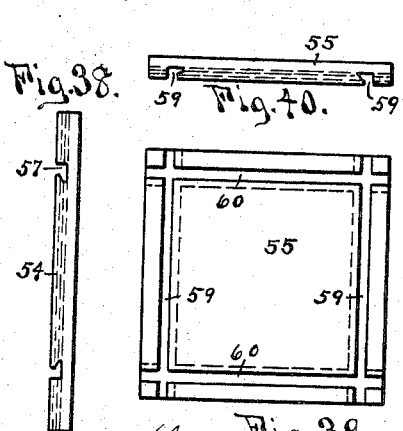
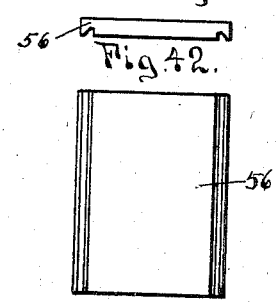
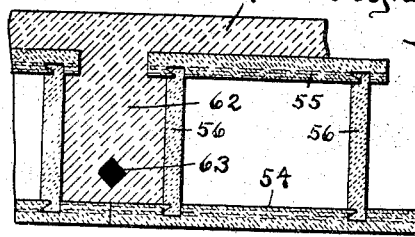

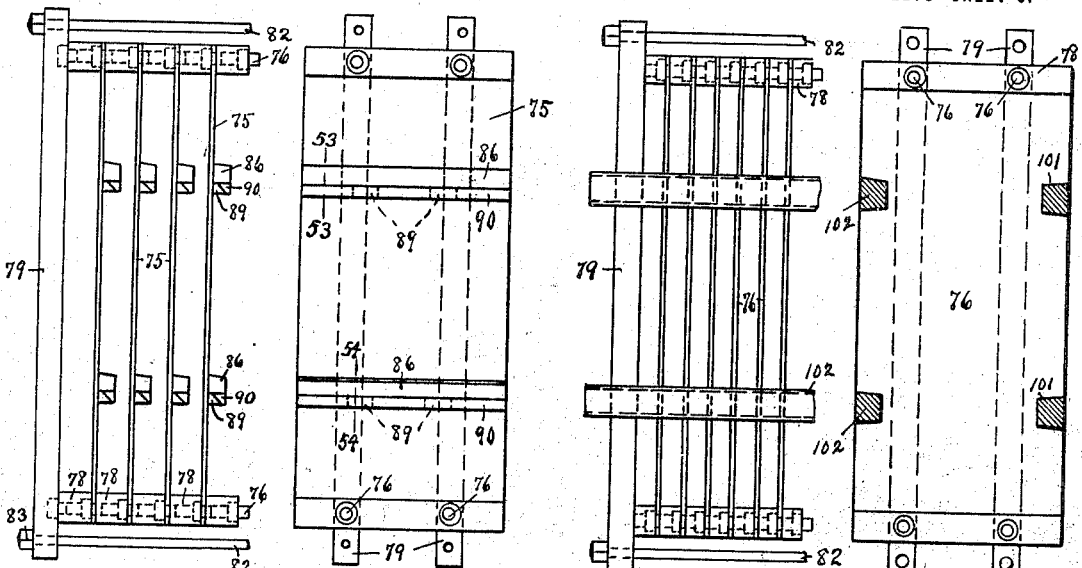
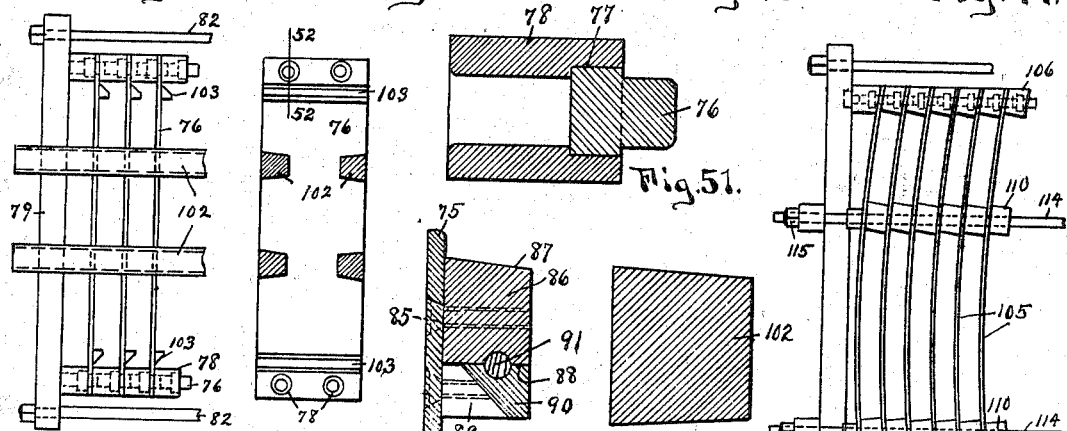
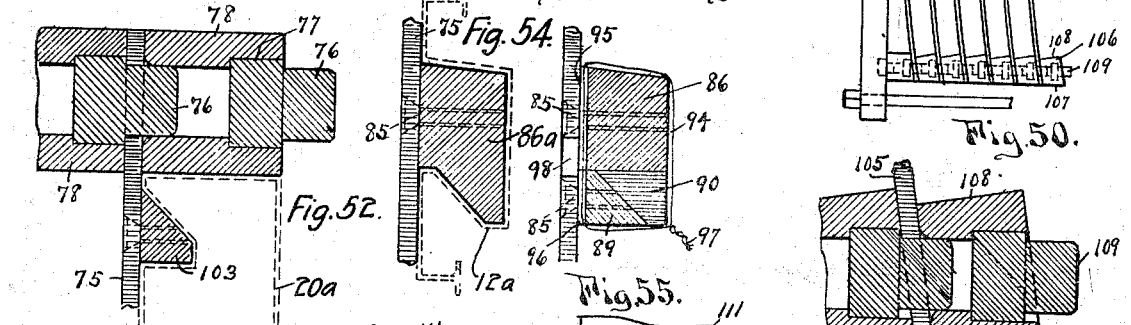
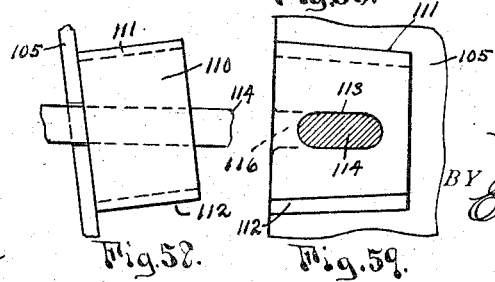

UNITED STATES PATENT OFFICE.

RALPH Z. HOPKINS, OF DETROIT, MICHIGAN.

BUILDING CONSTRUCTION.

1,226,214.  Specification of Letters Patent.  Patented May 15, 1917.

Application filed February 26, 1914. Serial No. 821,145.

*To all whom it may concern:*

Be it known that I, RALPH Z. HOPKINS, a citizen of the United States, and a resident of Detroit, in the county of Wayne and State of Michigan, have invented a new and Improved Building Construction, of which the following is a specification.

This invention relates to the construction of walls and slabs by pouring concrete into permanent molds formed by previously manufactured blocks, preferably of concrete, and consists in the special blocks and connectors used in such construction.

This invention also consists in a series of molds for forming the various blocks, said blocks when assembled being adapted to form molds for concrete fillings, columns, girders, and the like.

It further consists in the particular details of construction shown and described, and particularly pointed out in the claims.

In the drawings, Figure 1 is a perspective view of a portion of a corner of a structure embodying my invention. Fig. 2 is a plan of a portion of a wall showing how a pilaster or vertical abutment may be formed thereon. Fig. 3 is a transverse section of a portion of a wall having two air spaces therein. Fig. 4 is a side elevation of one of the face blocks. Fig. 5 is a plan thereof. Fig. 5ᴬ is a plan of a portion of the block shown in Fig. 5 indicating the manner in which the tongue and groove may be reinforced. Fig. 6 is a plan of a modified form of face block. Fig. 7 is a side elevation of an intermediate connecting or bonding block. Fig. 8 is a plan thereof. Fig. 8ᴬ is a plan corresponding to the end of Fig. 8 showing a metal facing that may be used. Fig. 9 is a side elevation of a bottom or top connecting block. Fig. 10 is a side elevation of a longitudinal interior block. Fig. 11 is a plan thereof. Fig. 12 is a plan of a chimney embodying my invention. Fig. 13 is a section on the line 13—13 of Fig. 12. Fig. 14 is a plan of a column or fire proofing for metal columns. Fig. 15 is a plan of one of the face blocks shown in Fig. 12. Fig. 16 is a side elevation thereof. Fig. 17 is a plan of one of the connecting blocks shown in Fig. 12. Fig. 18 is a side elevation thereof. Fig. 19 is a plan of another connecting block shown in Fig. 12. Fig. 20 is a side elevation thereof. Fig. 21 is a plan of a third connecting block, adapted to be used with the construction shown in Fig. 2. Fig. 22 is a side elevation thereof. Fig. 23 is a plan of a portion of a wall embodying my invention showing the manner of casting a column and floor beams in position. Fig. 24 is a section on the line 24—24 of Fig. 23. Fig. 25 is a section on the line 25—25 of Fig. 24. Fig. 26 is a plan of a face block shown in Fig. 23. Fig. 27 is a side elevation thereof. Fig. 28 is a plan of a connecting block shown in Fig. 23. Fig. 29 is a side elevation thereof. Fig. 30 is a side elevation of a similar block used to form a mold for the columns. Fig. 31 is a plan of a curved wall embodying my invention. Fig. 32 is a plan of a portion of a floor embodying my invention, the blocks being in position to form molds for floor beams. Fig. 33 is a similar view showing the finished floor, portions being broken away. Fig. 34 is a section on the line 34—34 of Fig. 33. Fig. 35 is a view similar to Fig. 32 showing the blocks in position to form floor beams that extend in one direction only. Fig. 36 is a plan of a face block shown in Figs. 32 and 34. Fig. 37 is a side view thereof. Fig. 38 is a side view at right angles to Fig. 37. Fig. 39 is a plan of the upper face block shown in Fig. 34. Fig. 40 is a side view thereof. Fig. 41 is an elevation of a face block shown in Fig. 35. Fig. 42 is a side view thereof. Fig. 43 is a side view of a modification. Fig. 44 is a plan of a mold for making a series of the blocks shown in Fig. 5. Fig. 45 is a side elevation thereof. Fig. 46 is a plan of a mold for making a series of the blocks shown in Fig. 10. Fig. 47 is a side elevation thereof. Fig. 48 is a plan of a mold for making a series of blocks shown in Fig. 7. Fig. 49 is a side elevation thereof. Fig. 50 is a plan of a mold for making a series of the curved blocks shown in Fig. 31. Fig. 51 is a section of a spacer that may be used in these molds. Fig. 52 is a section on the line 52—52 of Fig. 49, showing one of the facing plates 20ᵃ in dashed lines. Fig. 53 is a section on the line 53—53 of Fig. 45. Fig. 54 is a modification on a line corresponding to the line 53—53 of Fig. 45, one of the facing plates 12ᵃ being shown in dashed lines. Fig. 55 is a corresponding section of a further modification. Fig. 56 is an enlarged section of one of the notch-forming members shown in Fig. 47. Fig. 57 is a fragmentary longitudinal section of the edge of the mold shown in Fig. 50. Fig. 58 is a plan of a notch-forming and spacing block shown in Fig. 50. Fig. 59 is an elevation of the structure shown in Fig. 58.

Similar reference characters refer to like parts throughout the several views.

The wall shown in Fig. 1 is made up of a series of outer face blocks 1, a series of inner face blocks 2, a series of longitudinal interior blocks 3, a series of intermediate connecting blocks 4, a series of upper connecting blocks 5, a series of lower connecting blocks 6, a series of corner face blocks $1^a$, and a series of corner-connecting blocks $1^b$. The blocks 3 are arranged in spaced vertical planes to provide an air-space in the interior of the wall, and the openings between the outer and inner face blocks and the adjacent blocks 3 may be filled with concrete 7 provided with reinforcing bars 8.

Each of the face blocks 1 (Figs. 4 and 5) comprises a preferably rectangular body that may be reinforced by the longitudinal rods 9 and the transverse rods 10, and may be provided with the dove-tail grooves 11, partially across which the ribs or tongues 12 extend in the manner indicated. If desired, the groove 11 and tongue 12 may be provided with the metal facing $12^a$ which may be anchored in the block by means of the inwardly projecting ends $12^b$, whose extremities may be slitted, the alternate slits being bent in opposite directions as indicated at $12^c$. (Fig. $5^A$).

The outer face of the blocks may be corrugated, as shown at 13 in Fig. 6, for the reception of plaster or other facing.

Each of the longitudinal interior blocks 3 preferably comprises a rectangular body that may be reinforced by the longitudinal rods 15 and the transverse rods 16 (Fig. 10), and the upper and lower edges of the blocks have formed therein the notches 17.

Each of the intermediate connecting blocks 4 (Fig. 7) preferably comprises a rectangular body that may be reinforced by the longitudinal rods 18. The upper and lower edges of the body have formed therein the notches 19, and one face may be provided with a groove 20, near each end of the block, which grooves are so arranged as to leave the laterally projecting ribs or tongues 21 along the edges of this face. The ends so formed are of a cross-section corresponding to that of the grooves 11 in the inner faces of the face blocks. If desired, the groove 20 and rib 21 may be provided with the metal facing $20^a$ which extends around the end of the block as indicated at $20^b$, and whose inwardly projecting ends $20^c$ may be slitted at $20^d$ to firmly secure the plate to the block. (Fig. $8^A$.) Each of the top and bottom connecting blocks 5 and 6 may be a duplicate of a longitudinal half of the intermediate connecting block just described, and the like numerals indicate corresponding parts. See Fig. 9.

The corner face blocks $1^a$ differ from the face blocks 1 merely in the location of the transverse grooves 11, and in the provision of a beveled end 22. The corner connecting blocks $1^b$ differ from the connecting blocks 4, 5 or 6, as the case may be, merely in that a portion of one end is omitted.

As indicated in Fig. 2, the exterior surface of a pilaster or vertical abutment is formed according to my invention by substituting the face blocks 24 and 25, that may have mitered corners 26, for one of the face blocks 1. The blocks 24 are each shown with a single vertical groove therein, and the block 25 is shown provided with a pair of grooves corresponding to the grooves in the face blocks 1. The blocks 24 are preferably joined by the connecting block 27 similar to the blocks 4; and the face block 25 is joined to the face block 1 on the opposite side of the wall by the connecting blocks 28. The blocks 28 are longer than the blocks 4 and are notched in a similar manner to receive the longitudinal blocks 3. They are also notched to interlock with the connecting block 27. The space between the blocks 28—28 and 3—3 may be utilized as a flue if desired.

In Fig. 3 is indicated a wall provided with two sets of double rows of longitudinal inner blocks 3 connected by blocks 30, each of which is provided with four notches along its edge. Upon filling the spaces between the face blocks and the adjacent inner blocks, and the space between the inner rows of each series of inner blocks with concrete 7, a wall is formed having two longitudinal air-spaces therein.

Figs. 12 and 13 show a chimney in which my invention is embodied. The exterior surface is formed of a series of face blocks 31 that are in all respects similar to the blocks 25, previously described. The opposite exterior blocks are joined by a series of connecting blocks 32, and these are in turn joined by the connecting blocks 33 to whose inner faces the plaster or concrete facing 34 may be applied, thereby forming a smoke flue. If desired, the plastering 34 may be omitted, and a tile $34^a$ of smaller cross-sectional dimensions than the opening inclosed by the blocks 33 may be inserted as indicated in dashed lines, in which case the space between the tile and the blocks may be filled with concrete (not shown). The space between the blocks 31 and 32 is preferably filled with concrete 7.

In the modification shown in Fig. 14, the face blocks 31 are joined by the connecting blocks 35 and a filling of concrete 7 is applied as before. This structure is adapted for fire proofing metal columns besides being adapted to serve as a pillar or chimney.

Each of the connecting blocks 32 comprises a rectangular body portion provided with the grooves 36, similar to the grooves 11 previously described, (Figs. 17 and 18) and the projecting ends 37 and 38. These ends are each preferably of half the depth of the body portion, and are symmetrical about the center line of the block as shown, one surface being grooved at 39 to form the rib or tongue 40.

The connecting block 33 (Figs. 19 and 20) comprises a rectangular body portion provided with the corrugations 42, and the projecting ends 43ª that are similar to the ends 37 of the block 32.

In Figs. 21 and 22 is shown a modified form of connecting block that may be found desirable under some conditions. It differs from the block shown in Fig. 20 mainly in the omission of the corrugations 42 and in the provision of the notches 44 that are formed in the upper and lower surfaces of each end. This latter connecting block may be used to form one side of a mold (Fig. 2) in which a column or post may be formed by filling in the space between these blocks and the adjacent blocks 28.

In the construction shown in Figs. 23, 24 and 25, which illustrate the manner of forming columns and girders according to my invention, face blocks 45 similar to the face blocks 1 are employed throughout. The usual connecting blocks 4ª are also employed with the exception of those immediately adjacent to the point where the column is to be formed. At that point two vertical rows of spaced connecting blocks 4ª are replaced by corresponding rows of wider blocks 46 (Figs. 24 and 30). At the level of the lower face of the girder, members 47, that may be sheet metal, boards, or the like, are laid longitudinally of the wall; and the space inclosed by the face blocks and the blocks 46, together with the space bounded by the members 47 and the adjacent face blocks up to a level of the top of the proposed girder, is filled with concrete 48. In the preferred construction, reinforcing rods 49 and 50, respectively, are used in the column and in the girder. It will be understood that the blocks 47 in Fig. 24 may be omitted and the blocks 46 replaced by connectors 4ª, after which the entire space between the face blocks can be filled with concrete, so as to constitute a retaining wall of great strength. Reinforcing bars of any desired size and number being placed where necessary.

The face blocks 45 (Figs. 26 and 27) differ from the blocks shown in Figs. 4 and 6 merely in that the longitudinal reinforcing elements 9 are omitted, the transverse reinforcing elements 10 being retained and increased in number.

The connecting blocks 4 used in the curved wall shown in Fig. 31 are the same as those described with reference to Fig. 1; the face blocks 52 and 52ª and longitudinal inner blocks 53 differ from those already described merely in that those of the outer rows are made relatively longer than those of the inner rows to correspond with the increasing lengths of arc, and in their curvature.

The floor shown in Figs. 32, 33 and 34 comprises a series of lower face blocks 54 (Figs. 36 and 37), a series of upper face blocks 55 (Figs. 39 and 40), and a series of connecting blocks 56. The blocks 54 are rectangular, the upper surface being provided with the grooves 57 and 58 that are arranged at right angles to each other, and whose cross-section may be the same as that of the grooves 11 shown in Fig. 5. The blocks 55 are likewise provided with the grooves 59 and 60. Each of the blocks may be reinforced in any suitable manner, as indicated in Fig. 10. It will be noted that the blocks 54 are of larger external dimensions than the blocks 55. The connecting blocks 56 are preferably of less length than the distance between opposite pairs of the grooves 57, 58, 59 and 60. When the blocks are assembled in the manner shown, spaces are left between the connecting blocks 56 that join adjacent blocks 55 to the opposite face blocks 54. These spaces are preferably filled with concrete 62 which may be reinforced at 63 to form beams at right angles to each other along opposite sides of the blocks 55. The concrete may also be spread over the tops of the blocks 55 as indicated at 64 to form a thick floor. In Fig. 32, the central portion of the upper block 55 comes immediately over the point where four of the lower blocks 54 meet, which will insure the whole floor structure being tied together. The structure shown in Fig. 33 is formed of units which can be assembled before they are placed on the falsework.

The connecting blocks 56 are similar to the blocks 4, previously described, and may be corrugated on one side at 66, as shown in Fig. 43, to form a bonding surface for the concrete 62.

The floor shown in Fig. 35 differs from that just described merely in the fact that one series of the grooves is omitted in the upper face blocks 68 and the lower face blocks 69. The upper blocks are in this instance brought into end-to-end contact, whereby spaces 70 are formed along two sides of each block only. Upon filling these spaces with concrete (not shown) and providing a proper reinforcing means, a series of parallel floor beams are formed.

The blocks used in my construction are formed in a series of molds that will now be described:—The individual molds comprise a series of preferably metal plates 75 having perforations in their outer ends to receive the dowels 76 that are inserted into the seats 77 formed in the upright spacers 78, shown in cross-section in Figs. 51 and 52. The plates 75 and the spacers 78 are held together by any suitable device, such as cross pieces 79 at each end of the mold, and the bolts or threaded rods 82 and the nuts 83 connecting the cross pieces.

The grooves 11 are preferably formed by the cores shown in Fig. 53. The plates 75 have secured thereto, by means of the screws 85 or otherwise, the quadrangular core bar 86 whose side 87 is beveled sufficiently to allow the bar to be drawn from the concrete. Also secured by screws or otherwise to the plate 75 are short substantially triangular spacing blocks 89 upon which the substantially triangular core-element 90 may rest. After the core-element 90 is placed in position it is prevented from moving relatively to the core bar 86 by the longitudinal key 91 that is received in the registering grooves formed in each of the members 86 and 90, said key preferably being of circular cross-section Fig. 53. The members 86, 89 and 90 may also be bound together by the wire 94 (Fig. 55) that is received in the grooves 95 and 96 formed, respectively, in the members 86 and 89, the ends of the wires being twisted together at 97. When blocks provided with the face plate 12ª are to be made, a core bar 86ª (Fig. 54) of a cross section corresponding substantially to that of the groove 11 may be used, in which case the block would be separated from the mold by sliding one laterally in respect to the other.

It will be understood that cement or concrete is tamped or poured into the spaces between adjacent plates 75 while the bottom of the molds rests upon a floor or other surface (not shown). The groove between the plate 75 and the adjacent core-element 90, with the exception of the short lengths occupied by the blocks 89, is thereby filled and forms the tongue or rib 12 integral with the body of the block. When it is desired to free the mold from the blocks, the plates 75 are freed by removing the clamps, the individual blocks are placed flat on pallets, the spacers 78 removed and the keys 91 are withdrawn, so that the plates 75 and the core bars 86 can be lifted from the block. The core-element 90 is then shifted over into the space formerly occupied by the bar 86 and lifted out. In the modification shown in Fig. 55, the wire 94 is cut by a tool extending through a small opening 98, after which the core bar 86 and core-element 90 are lifted out as before.

The mold shown in Figs. 46 and 47, by which the blocks 3 are formed, is similar to the mold previously described, but differs therefrom in the omission of the parts 86, 89 and 90. The plates 76 that are used in this mold differ from the plates 75 in that they are provided with the grooves 101 through which the core-bars 102 extend, said core-bars being for the purpose of forming the notches 17 in the block. The operation of this mold will be readily understood.

The blocks 4 (Figs. 7 and 8) are formed in the mold shown in Figs. 48 and 49. This mold differs from that last described merely in the addition of the transverse substantially triangular ribs 103 near each end of the plates 76, these ribs being for the purpose of forming the grooves 20.

The curved interior blocks 53 (Fig. 31) are formed in the mold shown in Fig. 50. The curved mold plates 105, that correspond to the mold plates 76, are separated by the rectangular spacers 106 shown in cross section in Fig. 57, one side 107 of which is preferably parallel to the length of the mold-frame, the other side 108 being perpendicular to the curve, (Fig. 57). These spacers are provided with dowels 109 similar to the dowels 96 previously described. The notches in the edges of the curved blocks are formed by a series of core blocks 110 whose sides 111 and 112 taper in the manner shown in Figs. 58 and 59. These blocks are slotted at 113 to receive the connecting bar 114 which is of a cross-section corresponding to the shape of the slot, and whose outer ends are provided with tightening nuts 115 and which extend in notches 116 in the plates 105. It will be understood that the blocks 110 are prevented from turning angularly about the bar 114 by the irregular sections of the slot and bar.

It is obvious that many changes may be made in my invention by persons skilled in the art. The embodiments disclosed herein I regard as merely illustrative, and hence do not wish to be limited otherwise than by the scope of the subjoined claims.

What I regard as my invention is:—

1. A building structure comprising face blocks provided with a series of grooves in their inner faces and a series of tongues partly closing the grooves, a series of inner blocks, each block having notches formed in its edges corresponding in number and location to the grooves in the face blocks, and a series of transverse connecting blocks joining the inner blocks and the face blocks, each connecting block having a groove at each end which forms a tongue, said tongue and groove corresponding to a tongue and groove in the adjacent face block, and a series of notches in its edges corresponding in location to the inner blocks whereby the whole is rigidly secured together.

2. A building structure comprising face blocks provided with a series of grooves in their inner faces and a series of tongues partly closing the grooves, a series of inner blocks, each block having notches formed in its edges corresponding in number and location to the grooves in the face blocks, and a series of transverse connecting blocks joining the inner blocks and the face blocks, each connecting block having a groove at each end which forms a tongue, said tongue and groove corresponding to a tongue and groove in the adjacent face block, a series of notches in its edges corresponding in location to the inner blocks whereby the whole is rigidly secured together, and a filling of concrete between the face blocks and the adjacent inner blocks.

3. A building structure comprising longitudinal face blocks provided with a series of grooves in their inner faces and a series of tongues partly closing the grooves, a series of longitudinal spaced rows of inner blocks, each block having notches formed in its edges corresponding in number and location to the grooves in the face blocks, and a series of transverse connecting blocks joining the inner longitudinal blocks and face blocks, each connecting block having a groove at each end which forms a tongue, said tongue and groove corresponding to a tongue and groove in the adjacent face block, and a series of notches in its edges corresponding in location to the rows of inner blocks, whereby the rows of blocks are rigidly united, and a filling of concrete between some of the rows of blocks.

4. In a building structure, a series of face blocks in spaced pairs, one of the pairs being arranged at right angles to another pair, the opposite members of each pair being joined by connecting blocks, the connecting blocks that join one pair of face blocks being arranged to cross the connecting blocks that join another pair of face blocks and being reduced in cross-section at the intersecting points.

5. In a building structure, a series of face blocks in spaced pairs, one of the pairs being arranged at right angles to another pair, the opposite members of each pair being joined by connecting blocks, the connecting blocks that join one pair of face blocks being arranged to cross the connecting blocks that join another pair of face blocks and being reduced in cross-section at the intersecting points, and a concrete filling between the face blocks and the connecting blocks.

6. In a building structure, a series of face blocks in spaced pairs, one of the pairs being arranged at right angles to another pair, said face blocks each having a groove therein and a tongue projecting partly across the groove, the opposite members of each pair being joined by connecting blocks, the connecting blocks that join one pair of face blocks being arranged to cross the connecting blocks that join another pair of face blocks and being reduced in cross-section at the intersecting points, each of the connecting blocks having a series of grooves formed in its inner face and a series of tongues each partly closing a groove, a second series of connecting blocks joining the members of each pair of the first series of connecting blocks, the members of said second series of connecting blocks that join opposite pairs of the first mentioned connecting blocks being arranged to cross each other and being reduced in cross-section at the points of intersection, each end of each of the members of the second series of connecting blocks being provided with a groove and a tongue, said tongue and groove corresponding to one of the tongues and grooves in the first mentioned connecting members.

7. A building structure comprising a plurality of tiers of face blocks arranged in a plurality of horizontally spaced rows, each of the blocks being provided with a series of tongues and grooves that are alined with similar tongues and grooves in the blocks of vertically adjacent tiers, a series of horizontally spaced rows of transverse connecting blocks joining the face blocks, each connecting block having a tongue and groove at each end corresponding to the tongue and groove in the adjacent face block, and each connecting block being arranged to engage with and join the face blocks of a plurality of the tiers in one of the spaced rows of face blocks with the blocks in a plurality of the tiers in another row of face blocks, the connecting blocks of one of the transverse rows being also arranged to engage with the vertically adjacent connecting blocks of the same row throughout a portion of its height to form a tight partition, and being spaced from the vertically adjacent block of the same row at another portion of its height, a concrete filling for the space between the face blocks on one side of the plane of the partition, and a concrete filling for a portion of the space between the face blocks on the opposite side of the partition, the space between the vertically adjacent connecting blocks allowing the concrete on both sides of the plane of the partition to be bonded together.

8. A building structure comprising a plurality of tiers of face blocks arranged in a plurality of horizontally spaced rows, each of the blocks being provided with a series of tongues and grooves that are alined with similar tongues and grooves in the blocks of vertically adjacent tiers, a series of horizontally spaced rows of transverse connecting blocks joining the face blocks, each connecting block having a tongue and groove at each end corresponding to the tongue and groove in the adjacent face block, and each connecting block being arranged to engage with and join the face blocks of a plurality of the tiers in one of the spaced rows of face blocks with the blocks in a plurality of the tiers in another row of face blocks, the connecting blocks of one of the transverse rows being also arranged to engage with the vertically adjacent connecting blocks of the same row throughout a portion of its height to form a tight partition, and being spaced from the vertically adjacent block of the same row at another portion of its height, a concrete filling for the space between the face blocks on one side of the plane of the partition, and a concrete filling for a portion of the space between the face blocks on the opposite side of the partition, horizontally arranged bonding elements passing through the space between the vertically adjacent connecting blocks and bonding the concrete on opposite sides of the plane of the partition together.

9. A building structure comprising a plurality of longitudinal rows of face blocks provided with a series of grooves in their inner faces and a series of tongues partly closing the grooves, a series of inner blocks, each inner block having notches formed in its edges corresponding in location to the grooves in the face blocks, the rows of face blocks being separated from each other a given distance throughout a portion of their length, and a greater distance throughout another portion of their length, and a series of transverse connecting blocks joining the inner blocks and the face blocks, each connecting block having a groove in one end that forms a tongue, said tongue and groove corresponding to a tongue and groove in the adjacent face block, and a series of notches in its edges corresponding in location to the inner blocks whereby the whole is rigidly secured together.

10. A building structure comprising a plurality of longitudinal rows of face blocks provided with a series of grooves in their inner faces and a series of tongues partly closing the grooves, a series of longitudinal spaced rows of inner blocks, each block having notches in its edge corresponding in location to the grooves in the face blocks, the rows of face blocks being separated from each other a given distance throughout a portion of their length, and a greater distance throughout another portion of their length, and a series of transverse connecting blocks joining the inner longitudinal blocks and face blocks, each connecting block having a groove at each end which forms a tongue, said tongue and groove corresponding to a tongue and groove in the adjacent face block, and a series of notches in its edges corresponding in location to the rows of inner blocks, whereby the rows of blocks are rigidly united, and a filling of concrete between some of the rows of blocks.

11. In a wall two courses of exterior slabs and two courses of interior slabs, all of said slabs extending longitudinally of the wall, transverse key slabs of sufficient length and adapted to engage and hold the slabs of all of said courses against lateral displacement, and a cement filling between the exterior and interior courses of slabs to form cement piers at each side of the wall.

In testimony whereof I have signed this specification in the presence of two subscribing witnesses.

RALPH Z. HOPKINS.

Witnesses:
L. M. SPENCER,
M. E. BROESAMLE.